United States Patent
Joos et al.

(10) Patent No.: US 7,977,817 B2
(45) Date of Patent: Jul. 12, 2011

(54) METHOD FOR PULSE WIDTH MODULATED CONTROL OF A PLURALITY OF LOAD ELEMENTS

(75) Inventors: Uli Joos, Nonnenhorn (DE); Josef Schnell, Wasserburg (DE)

(73) Assignee: Conti Temic Microelectronic, GmbH, Nurmberg (DE)

( * ) Notice: Subject to any disclaimer, the term of this patent is extended or adjusted under 35 U.S.C. 154(b) by 263 days.

(21) Appl. No.: 10/582,460

(22) PCT Filed: Dec. 10, 2004

(86) PCT No.: PCT/DE2004/002710
§ 371 (c)(1),
(2), (4) Date: Jun. 12, 2006

(87) PCT Pub. No.: WO2005/056342
PCT Pub. Date: Jun. 23, 2005

(65) Prior Publication Data
US 2007/0132316 A1 Jun. 14, 2007

(30) Foreign Application Priority Data
Dec. 11, 2003 (DE) .................. 103 58 274

(51) Int. Cl.
*H02J 3/00* (2006.01)
(52) U.S. Cl. .......................................................... 307/41
(58) Field of Classification Search .................... 307/41
See application file for complete search history.

(56) References Cited

U.S. PATENT DOCUMENTS

| 4,176,250 | A | 11/1979 | Berglind |
| 5,886,419 | A | 3/1999 | Saito et al. |
| 6,891,342 | B2 * | 5/2005 | Nakamura et al. ............. 318/77 |

FOREIGN PATENT DOCUMENTS

| DE | 40 06 124 | 9/1991 |
| EP | 0 982 194 | 10/1994 |

* cited by examiner

*Primary Examiner* — Robert L. Deberadinis (57) ABSTRACT

Disclosed is a method for pulse width modulated control of a plurality of load elements, particularly during supply of the load elements from a common supply system in motor vehicles. The load elements are controlled in a time staggered manner with respect to one another, more particularly in a phase staggered manner within a common pulse width. Switch loads and high frequency interferences in the supply lines and the corresponding emissions can thus be reduced. The invention also discloses a circuit arrangement in which a corresponding phase staggered control is achieved with only one counter.

11 Claims, 7 Drawing Sheets

PRIOR ART

PRIOR ART

Fig.4a
(16 Phases with 50% duty cycle

Multiphasing with 16 phases with 50% duty cycle

Fig.5b

Fig.6a
(Multiphasing with 9 phases with 50% duty cycle)

Fig.6b

Fig.7a
Multiphasing with 9 phases with 50% duty cycle

METHOD FOR PULSE WIDTH MODULATED CONTROL OF A PLURALITY OF LOAD ELEMENTS

BACKGROUND OF THE INVENTION

The invention relates to a method for pulse width modulated control of a plurality of load elements according a method for pulse width modulated control of a plurality of load elements, the load elements being controlled in time staggered manner with respect to each other.

The control of many electrical loads in a motor vehicle (e.g. lamps, heating coils, . . . ) is effected by means of pulse width modulation (PWM). Here, the power delivered to the load can be regulated or controlled, wherein the losses in control electronics can be kept small by the switch operation.

With the pulse width modulated control of loads in the motor vehicle, however, electromagnetical fields are emitted via the battery and load lines, which might disturb radio reception in the vehicle.

Therefore, for this purpose in different standards (IEC, ISO, CISPR) limiting values have been defined, which reduce impact of the radio receiver in the corresponding spectrums to a tolerable degree.

Suppression of the alternative currents on the lines is usually effected with low-pass filters (LC) in the input lines. Size and also costs of the filters conform with ampacity, required attenuation, quality and cut-off frequency. In motor vehicle control units the PWM is normally generated via timer modules integrated for a plurality of load elements into the microcontroller, all PWM-outputs connecting at the same time and disconnecting at different times depending on the PWM-repetition rate.

The disadvantage of this method is that a very high alternating current is taken from the mains, and, therefore, high demands must be made to the used filters, in particular to the storage condensers.

From EP-A2-0 982 194 a method for controlling electrical consumers in a supply system, for example of a motor vehicle, is known, in which the active state of the electrical consumer is constantly monitored and its control is effected by means of at least one control unit. This method allows for the best possible driving comfort under all operating conditions of the motor vehicle. A classification of all electrical consumers of the system into strategy groups, as well as a definition of control algorithms and priorities for the individual strategy groups, the storage of the classification and of the control algorithms of the strategy groups in a storage is effected. Furthermore, monitoring of all electrical consumers is effected by the control unit and storing of all detected data in the storage, as well as the simultaneous or time staggered control of the electrical consumer by the control unit after having evaluated the switching requirements of superior electrical consumers and release of the control of correspondingly defined algorithms.

Form U.S. Pat. No. 4,176,250 a multiplexer system with pulse width modulation for use in a motor vehicle is known. The system includes a transmitter assembly, which is located in the left front door, which transmits information to the receiver components, which are interconnected by a data line and which are arranged in the passenger doors and under the front seat. The receiver in the right front door is embodied in such manner that information can be delivered to the connected systems. An interference of the individual systems among each other is avoided by priority logistics.

It is the object of the invention to indicate a method of the above-mentioned type, by means of which the interferences can be further reduced.

SUMMARY OF THE INVENTION

This object is achieved by a method for pulse width modulated control of a plurality of load elements, the load elements being controlled in time staggered manner with respect to each other. In the method the load elements are controlled by a common control unit with a common system clock in phase staggered manner. Also, for each load element an initial value and a final value is predetermined and the initial values of the load elements diverge from each other, the final values of the load elements are determined according to the pulse-break ratio, and each load element is supplied with current for the period of time between the respective initial and final value.

The distribution of several PWM-channels within the time-frame of the switching frequency forms the basis of the invention. This means that the load elements are controlled in a time staggered manner with respect to one another, i.e. in particular also the switching flanks for the individual load elements are time staggered and thus their high-frequency electromagnetic interferences do not add but distribute over the time.

In particular when supplying the load elements from a common supply system, as it is usual in motor vehicles, this is fairly decisive. The method is to be used particularly also for ohm resistive load elements, for example for the central control of illuminants such as lamps or LEDs, in an electrically independent load circuit. Precisely in the automobile field preferably the control is effected pulse width modulated from a common control unit with a uniform pulse width, so that the load elements are each controlled only with an individual pulse-break ratio, the load elements being then controlled in a phase staggered manner within the pulse width.

Thereby, the on-transition times are preferably distributed within the clock period such that
  the alternating portion and thus the damping is minimal
  the resulting frequency (basic wave) of the input current is as high as possible and thus the required cut-off frequency or damping is as high as possible.

This can be effected by allocating the on-transition times to fixed phase relations.

The load elements are preferably controlled pulse width modulated with a uniform pulse width, an individual pulse-break ratio each, however, within the pulse width in a phase staggered manner with respect to each other. This allows for a control with a common control unit for several load elements from a common system clock, whereby the phase position of the individual load elements can be easily adjusted and can be kept quite accurately even with an unstable system clock.

Consequently, the load elements are preferably controlled in phase staggered manner by a common control unit with a common system clock.

The load elements are controlled preferably with an approximately identical phase offset within a pulse width, at least with load elements with approximately identical power input, as this identical phase offset can be realized in particularly easy manner.

This control can be realized in particularly easy manner by a common counter, in which the common system clock is counted up to a predetermined counter final value, for each load element an individual initial value and an individual final value from the counting region of the counter being predetermined.

The initial values of the load elements diverge according to the phase position of the load elements and the final values for the respective load elements are determined according to the pulse-break ratio.

Here, each load element is supplied with current for the time period between the respective initial and final value.

In a preferred manner for different operating situations different phase shifts of the individual load elements with respect to each other are predetermined.

For this purpose e.g. at least one of the following parameters is taken into account:

- the load elements to be currently controlled, in particular with an alternating connection of the individual load elements, however, with a pulse width ratio of the individual load elements, which is constant per se but only depends on the supply voltage, wherein in particular with an approximately identical power input it can be sufficient to detect only the number of the load elements to be currently controlled or
- the pulse width of the load elements to be currently controlled or
- the electrical power input or size proportional thereto of the load elements to be currently controlled or
- the harmonic content in the common supply line timed over the control of all load elements.

Thus, the control circuit for executing this method preferably comprises at least one common system timer and one storage region for each load element, in which the pulse width and the phase position of the respective load element are stored.

Preferably, a common counter is provided, which counts the system clock up to a predetermined counter final value. Pulse width and phase position for each load element are individually stored in form of an initial value and final value for the phase staggered pulse width modulated control of each load element.

Initial value and final value refer to the numerical region of the common counter, the counter working with overflow and resetting and a final value being reached with a number value which is smaller than the initial value and thus when reaching the value timed after the overflow or resetting.

Therefore, only one comparator is required for each load element, which compares the counter state with the initial and final value and dependent therefrom controls one switch each in the electric circuit to the load element.

In addition, preferably a reset-input is provided at the counter, by means of which for all load elements the control can be jointly synchronized by resetting and restarting the counter.

Preferably, a storage region is provided, in which for different operating situations different phase positions of the individual load elements with respect to each other are stored, and in which means for recognizing the current operating situation and selection of those phase position assigned to the current operating situation are provided.

For this purpose it is conceivable to provide a measurement arrangement in the common supply line for detecting the harmonic content. This allows for an evaluation of the harmonic content, for example for comparing it with a threshold value and in case of a harmonic content exceeding the threshold value to recognize this as a change of the operating situation and to change the phase positions. One could even conceive a self-regulating control cycle, which changes the phase positions of the load elements with respect each other in accordance with a predetermined scheme until the harmonic contents fall back below the threshold.

BRIEF DESCRIPTION OF THE DRAWINGS

The invention is to be described in detail in the following taken in conjunction with examples of embodiment and drawings.

DETAILED DESCRIPTION OF THE DRAWINGS

Figure 1:
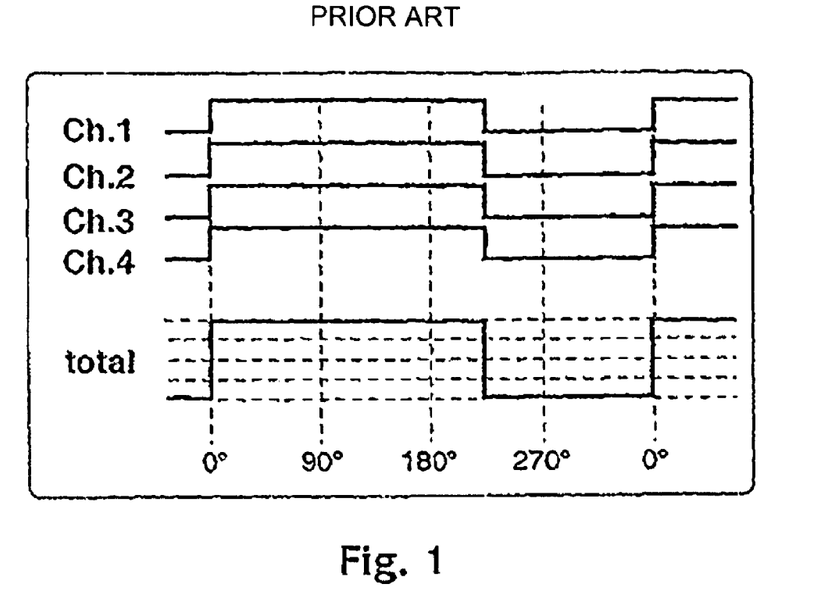
FIG. 1 shows a PWM control of 4 load elements according to the state of art with a control device and a draft of the summary load

FIG. 1 shows the progress with a conventional control, in which all load elements are connected at a point in time via the 4 control channels (ch.1-4) here shown and are disconnected according to the individual pulse-break ratio. Due to the superimposition this leads to strong high-frequency interferences. In fact, this control can be easily realized in technical manner by means of a counter, however, it, therefore, shows also considerable disadvantages.

Figure 2:
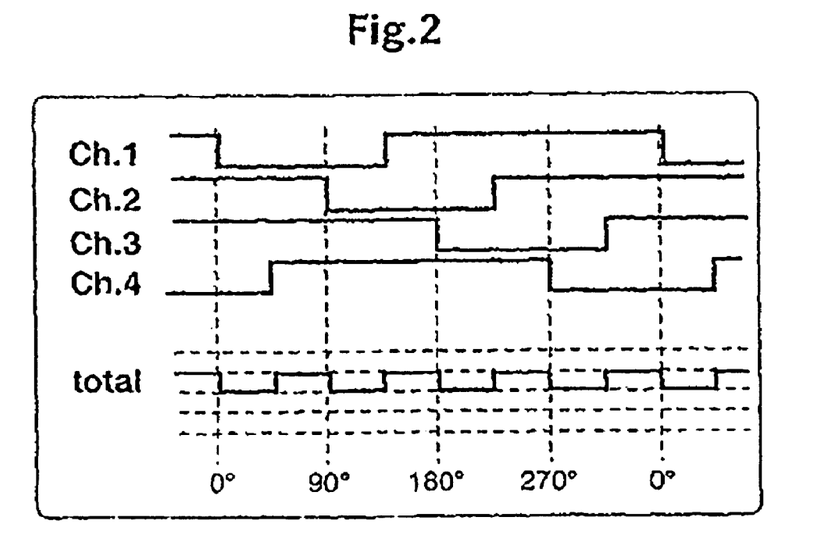
FIG. 2 shows a PWM control with phase off-set and a draft of the summary load

In contrast, FIG. 2 shows a multi-phase control according to the invention. Here, the number of phases is selected to be identical to the number of PWM-signals, i.e. between the channels there is an approximately identical phase shift of the leading edge, in this case of 360 degrees/4—per 90 degrees.

By graphical addition of fixed-ratio PWM-signals the improvement in the input alternating current can be derived from.

In the present example

- the frequency is multiplied with the number of PWM signals
- the alternating portion is divided through the number of PWM signals.

The method is applicable for any number, combination and weighting, the method is particularly advantageous for binary graduation and phase number.

Figure 3:
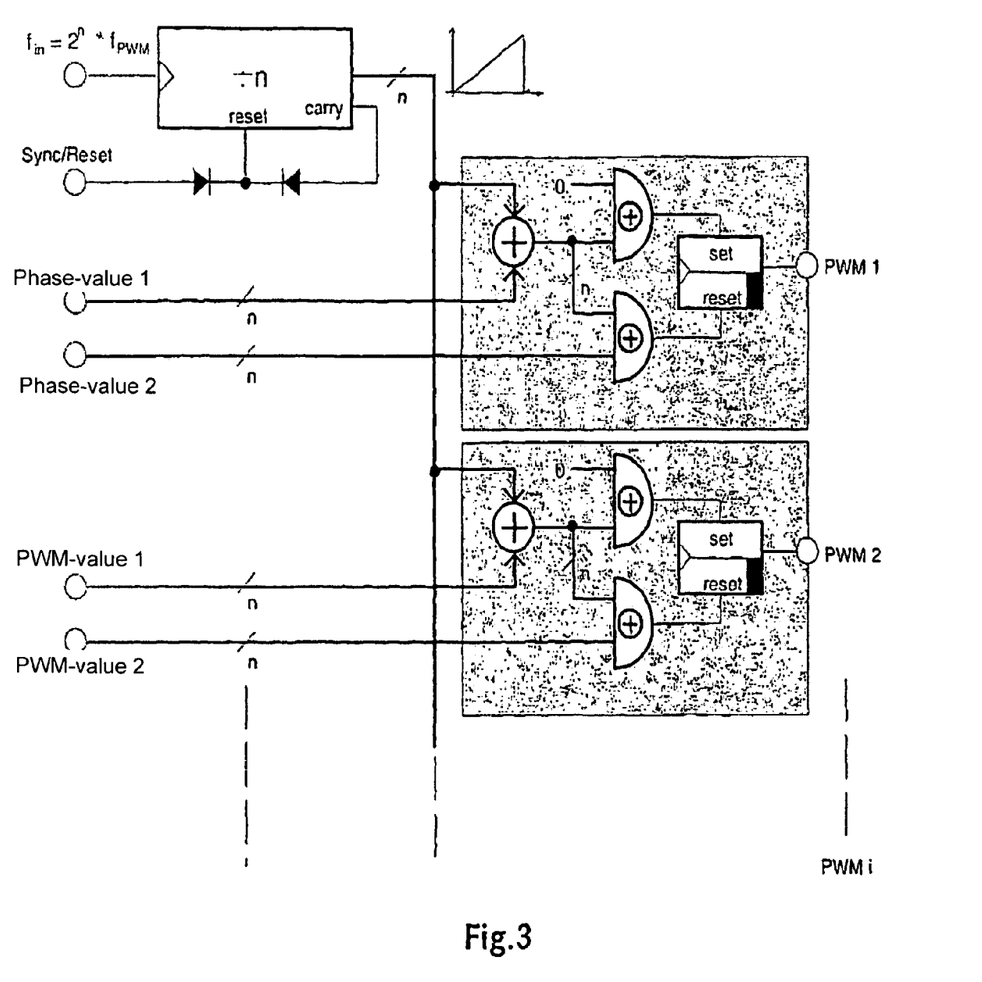
FIG. 3 shows an example of a circuit arrangement for executing the method

An example of embodiment for a multi-phase arrangement, which also requires only one counter, is shown in FIG. 3.

All PWM signals are derived from an input clock, wherein each PWM value and phase position can be programmed. The PWM signal itself is gained via digital comparators (EXOR) and a downstream latch (RS-flip-flop). Here, the latch is always

- set at the start of the period delayed by the phase value
- reset later on by the PWM value.

Programming of the phase position is effected very easily by adding the phase value to the initial value of the counter.

Therefore, a binary graduation of the phase position can be realized in particularly easy manner.

Via the sync/reset-input several PWM-modules can be synchronized to a phase position by resetting the counter.

By means of this a reduction of the electromagnetical emission into the radio frequency regions of pulse width modulated controls is achieved by multi-phase control of several PWM signals. Realization of multi-phase can be effected by hardware or software.

A partitioning of the different PWM signals to different phase relations is effected within the clock period for an optimal formation of the input alternating current of the electronics-module with a minimum amplitude or maximum frequency. With this the expenditure for the necessary input filters can be reduced.

In the following the variation of the phase position depending on the operating situation shall be described in more detail taken in conjunction with examples of embodiment.

Above, a possibility was already described to determine the phase position as a quotient of 360 degrees/n with a varying number n of load elements with approximately equal-sized electrical power input. Such a decomposition, however, cannot always be easily depicted with a binary counter and in particular connecting and disconnecting of individual load elements with a varying number of load elements is difficult. Therefore, another alternative shall be disclosed in the following.

The generating rule applied in this example for defining connecting phase can be derived from as follows:
The inputs each connect at the point in time $$\phi = \frac{\text{decimal value} - \text{phase position}}{2^n} \cdot 360°,$$

the connecting sequence being represented as a decimal number from the value region 0 to $2^n-1$, i.e. in this example until 15. The value 0 corresponds to 0 degrees phase position and each step to 22.5 degrees phase position or a to corresponding counter value.

| Number of active outputs minus 1 | For example: input | Decimal value of phase position | D3 | D2 | D1 | D0 |
|---|---|---|---|---|---|---|
| 0 | A0 | 0 | 0 | 0 | 0 | 0 |
| 1 | A8 | 8 | 1 | 0 | 0 | 0 |
| 2 | A4 | 4 | 0 | 1 | 0 | 0 |
| 3 | A12 | 12 | 1 | 1 | 0 | 0 |
| 4 | A2 | 2 | 0 | 0 | 1 | 0 |
| 5 | A10 | 10 | 1 | 0 | 1 | 0 |
| 6 | A6 | 6 | 0 | 1 | 1 | 0 |
| 7 | A14 | 14 | 1 | 1 | 1 | 0 |
| 8 | A1 | 1 | 0 | 0 | 0 | 1 |
| 9 | A9 | 9 | 1 | 0 | 0 | 1 |
| 10 | A5 | 5 | 0 | 1 | 0 | 1 |
| 11 | A13 | 13 | 1 | 1 | 0 | 1 |
| 12 | A3 | 3 | 0 | 0 | 1 | 1 |
| 13 | A11 | 11 | 1 | 0 | 1 | 1 |
| 14 | A7 | 7 | 0 | 1 | 1 | 1 |
| 15 | A15 | 15 | 1 | 1 | 1 | 1 |

It can be recognized that for determining the connecting sequence the bits of the binary number must be used in reverse sequence to their binary weight:

Bit 3 ==> sequence-bit 0
Bit 2 ==> sequence-bit 1
Bit 1 ==> sequence-bit 2
Bit 0 ==> sequence-bit 3

Therefore, the sequence results in:

$$\text{Decimal value-phase position} = D3 \cdot 2^0 + D2 \cdot 2^1 + D1 \cdot 2^2 + D0 \cdot 2^3;$$

Each load element or each output to be activated is registered according to the time sequence of activation and obtains the phase position allocated in the sequence to this position.

Figure 4A:
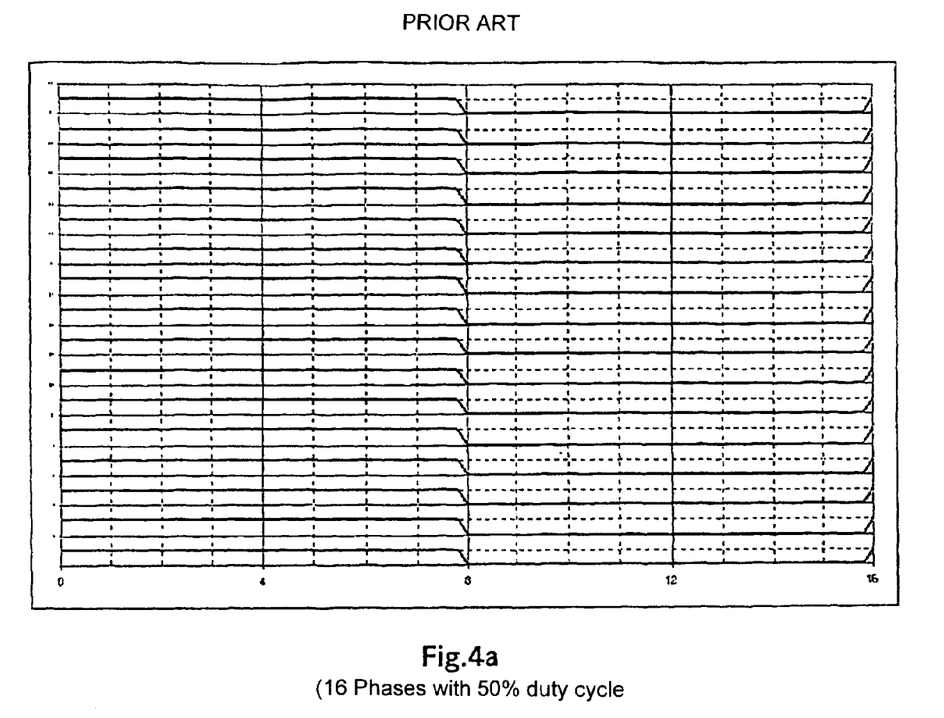
FIG. 4 shows a control of 16 load elements with a duty cycle of 50% according to the state of art without phase off-set and resulting progress of total voltage
Figure 4B:
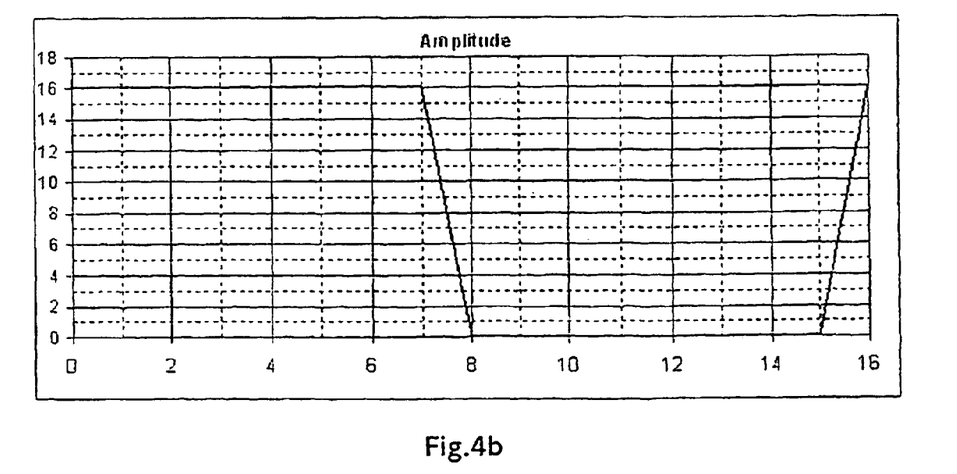

This shall be described in the following taken in conjunction with maximum 16 load elements which are parallel controllable from one supply system. At first, FIG. 4 drafts a usual control according to the state of art without phase off-set with a duty cycle of 50% and the resulting progress of total voltage, which comprises according strong oscillations and thus also harmonic waves. Here, the oscillations are scaled to standard values, the value 1 corresponding to one load element.

Figure 5A:
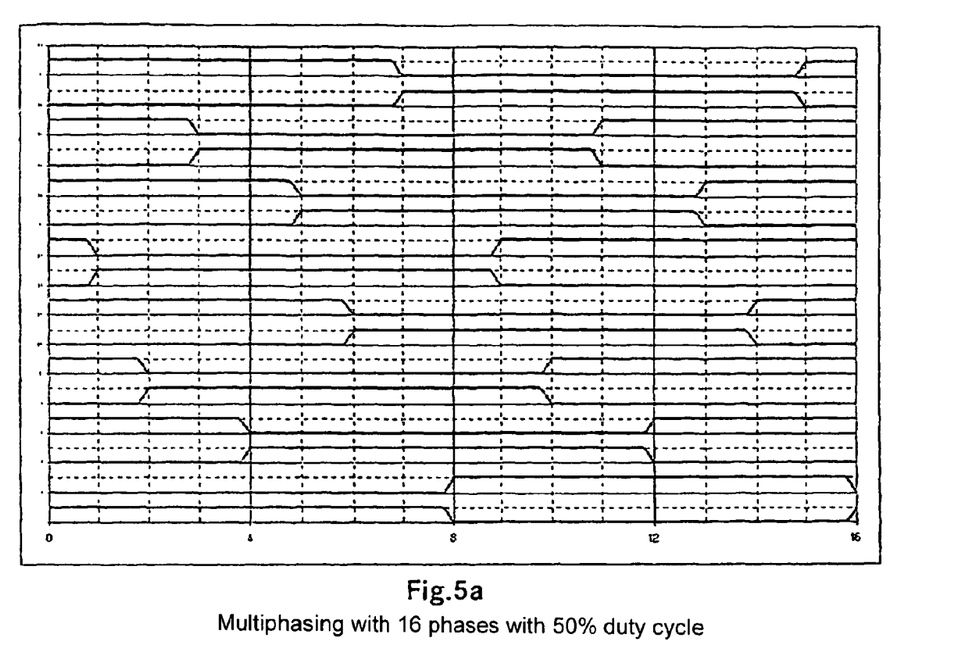
FIG. 5 shows a variant of a control of 16 load elements with a duty cycle of 50% with a predetermined phase off-set and resulting progress of total voltage
Figure 5B:
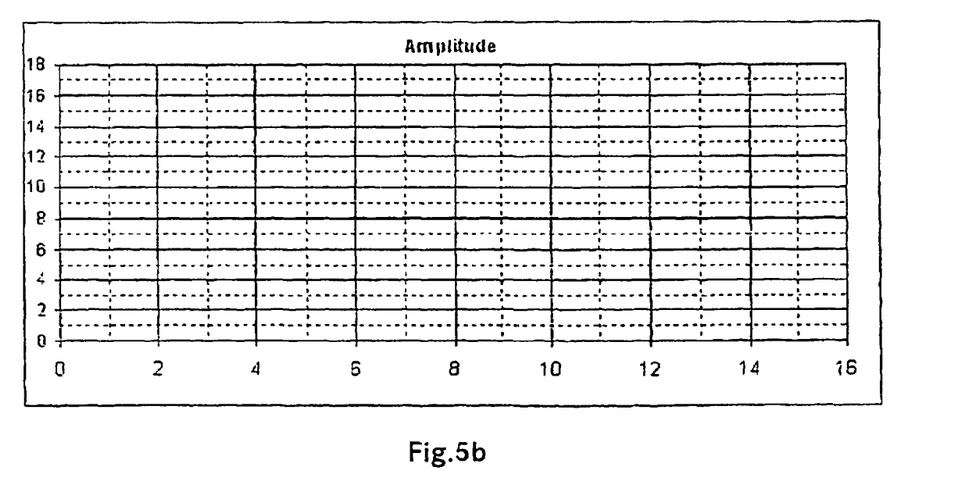

In contrast, FIG. 5 shows the above-mentioned variant of a control of all 16 load elements with a duty cycle of 50% with a phase off-set predetermined according to this binary generating rule and the constant progress of total voltage resulting in ideal manner.

From the bottom up in the sequence of connecting the individually connected outputs and corresponding connecting flanks are shown in FIG. 5, i.e. the output A0 firstly activated becomes active at the time 0, the second output A8 inversely at the time 8 and so on.

Figure 6A:
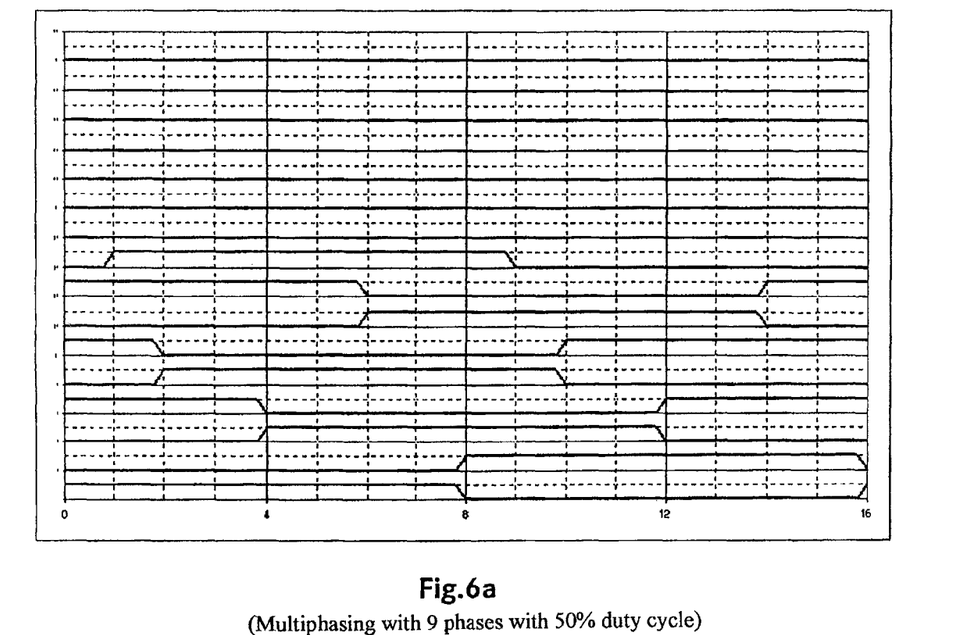
FIG. 6 shows a variant of a phase-shifted control when activating 9 out of 16 load elements with a duty cycle of 50%
Figure 6B:
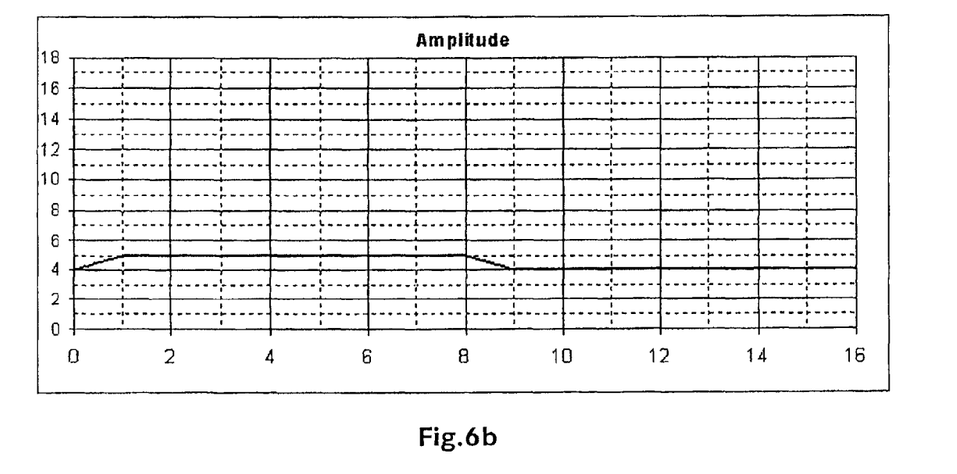

FIG. 6 drafts with this variant of a phase-shifted control the situation when activating 9 out of 16 load elements with a duty cycle of 50%. Based on the respective inversion by pairs with an odd-numbered number of load elements an appropriate oscillation occurs in the load in the supply system, which, however, fluctuates from the height of oscillation only by one unit referred to the power input of all load elements.

Figure 7A:
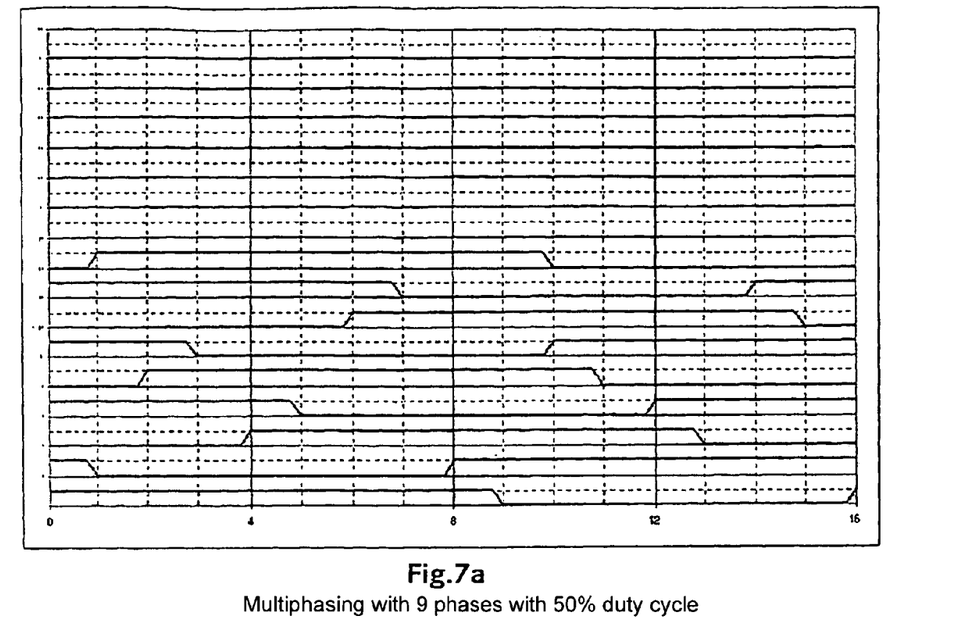
FIG. 7 shows a variant of a phase-shifted control when activating 9 out of 16 load elements with a duty cycle of 60%
Figure 7B:
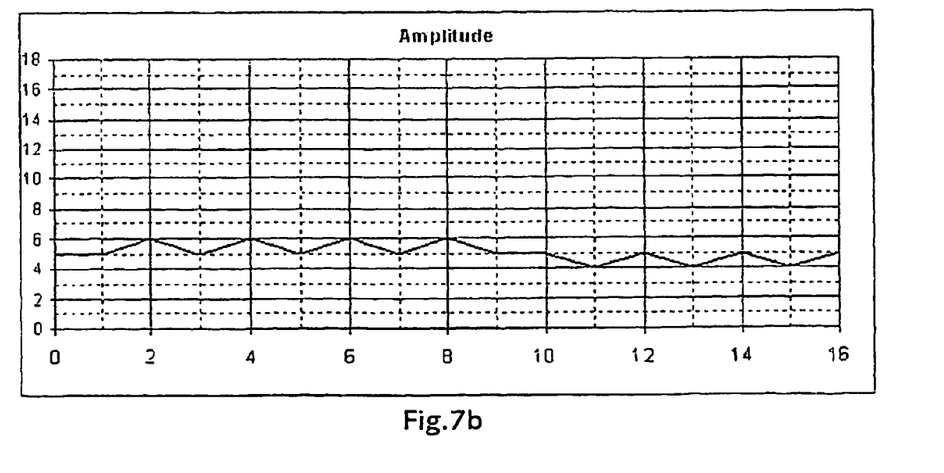

FIG. 7 drafts the control scheme of this variant of a phase-shifted control when activating 9 out of 16 load elements with a duty cycle of 60%. Duty cycles of more than 50% cause an overlapping of the active phases of successively activated load elements and thus lead to an oscillation in the total load. By the situation adapted predetermination of the phase position, however, the oscillation can be restricted to at most 2 standard values with 16 possible load elements.

If one or more load elements active so far are omitted, these are disconnected, and preferably a re-allocation of the phases again analogous to the above-mentioned generating scheme is effected.

These variants of the control so far started from load elements with an approximately identical power input. If these are load elements with a clearly different power input or if the duty cycles of the individual load elements diverge from each other, appropriately adapted phase schemes must be stored.

Therefore, it is particularly preferred to establish a universal circuit arrangement, for example to integrate in an ASIC, in which a plurality of different phase schemes can be freely programmed and thus depending on the application situation these universal assemblies are programmed according to the conceivable operating situation and occurring load conditions. If the power input of the load elements is at least approximately constant over the time, it is sufficient to evaluate the information anyway supplied to the control circuit via the load elements to be currently controlled and their PWM-ratios and for example to activate in a look-up table an assigned phase scheme.

Figure 8:
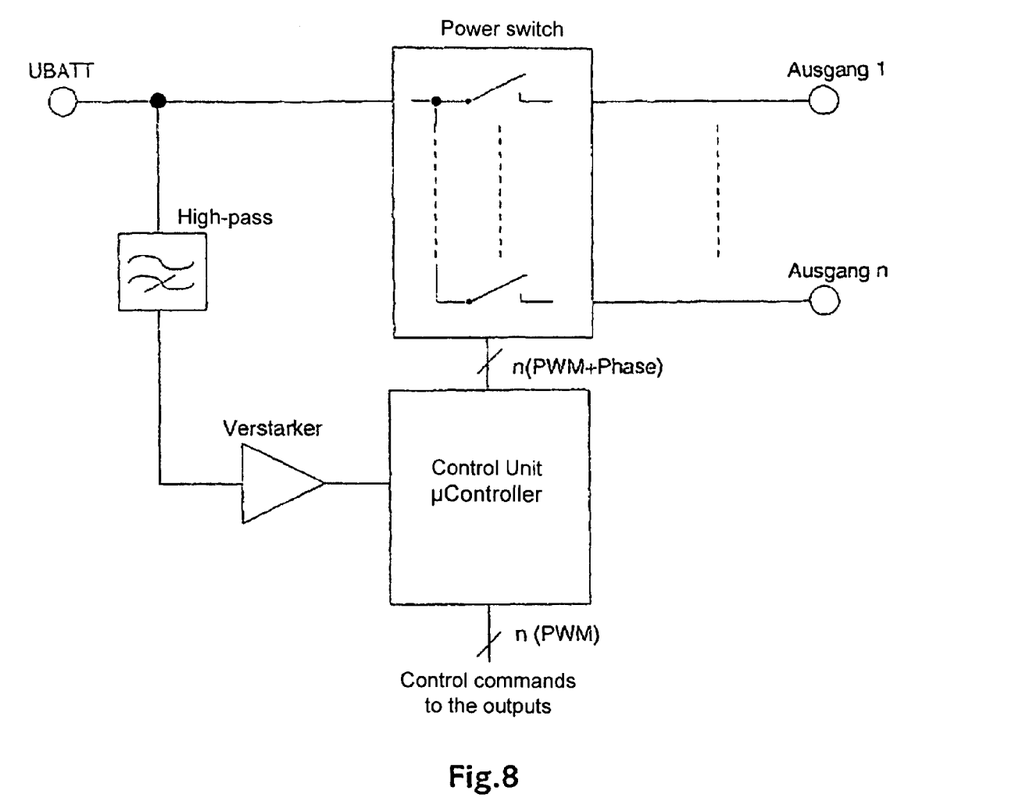
FIG. 8 shows a measurement of the harmonic content in the supply path.

FIG. 8 finally drafts the measurement of the harmonic content in the supply path. The alternating voltage portion on the input line is supplied via a high-pass to the control unit, which controls the power switches. Alternatively, a shunt resistance could be introduced in series into the input line and via a differential amplifier the voltage could be tapped via this shunt resistance and could be supplied to the high-pass. Here, the control unit can directly detect the alternating portion as an effect of the applied phase scheme. Depending on the output current, number of connected phases and pulse width of the individual outputs the phase scheme can be changed until a minimum alternating portion results on the input line. The change of the phase scheme can be effected by means of predetermined phase schemes or by defined varying or the like.

The invention claimed is:

1. A method for pulse width modulated control of a plurality of load elements, the load elements being controlled in time staggered manner with respect to each other, the method comprising:
    controlling the load elements by a common control unit with a common system clock in phase staggered manner;
    predetermining, for each load element, an initial value and a final value, wherein the initial values of the load elements diverge from each other and the final values of the load elements are determined according to the pulse-break ratio; and
    supplying each load element with current for a period of time between the respective initial and final value, wherein the load elements are resistive load elements in an electrically independent load circuit and are supplied from a common supply line.

2. A method according to claim 1, wherein a common system clock in a common counter is counted up to a predetermined counter final value.

3. A method according to claim 1, wherein for different operating situations different phase shifts of the individual load elements with respect each other are predetermined.

4. A method according to claim 1, wherein at least one of the following parameters is determined:
    a number of load elements to be currently controlled; or
    a pulse width of the load elements to be currently controlled; or
    an electrical power input or size proportional thereto of the load elements to be currently controlled with respect to each other; or
    a harmonic content in a common supply line timed over the control of all load elements.

5. A method according to claim 1, wherein illuminants, such as lamps or LEDs, in a motor vehicle, are controlled.

6. A method for pulse width modulated control of a plurality of load elements, the load elements being controlled in time staggered manner with respect to each other, the method comprising:
    controlling the load elements by a common control unit with a common system clock in phase staggered manner;
    predetermining, for each load element, an initial value and a final value, wherein the initial values of the load elements diverge from each other and the final values of the load elements are determined according to the pulse-break ratio; and
    supplying each load element with current for a period of time between the respective initial and final value, wherein a measurement arrangement is provided in the common supply line for detecting the harmonic content.

7. A control circuit for pulse width modulated control of a plurality of load elements, the load elements being controlled in time staggered manner with respect to each other, the circuit comprising:
    a common system clock; and
    a storage region for each load element, wherein a pulse width and a phase position of the respective load element are stored, wherein the load elements are resistive load elements in an electrically independent load circuit and are supplied from a common supply line.

8. A control circuit according to claim 7 further comprising:
    an initial value and final value for the phase staggered pulse width modulated control are stored;
    a common counter, which counts the system clock up to a predetermined counter final value;
    for each load element storage region an initial value and a final value are stored for the phase staggered pulse width modulated control; and
    for each load element a comparator and a switch, which compares the counter state with the initial and final value and dependent therefrom controls the switch in the electric circuit to the load element.

9. A control circuit according to claim 8, wherein a reset-input is provided at the counter, by which for all load elements the control can be jointly synchronized by resetting and restarting the counter.

10. A control circuit for pulse width modulated control of a plurality of load elements, the load elements being controlled in time staggered manner with respect to each other, the circuit comprising:
    a common system clock; and
    a storage region for each load element, wherein a pulse width and a phase position of the respective load element are stored, wherein the storage region stores different operating situations and different phase positions of the individual load elements with respect to each other; and
    a device for recognizing the current operating situation and selection of the phase position assigned to the current operating situation is provided.

11. A control circuit according to claim 10, wherein a plurality of different phase positions of the individual load elements with respect to each other can be programmed via an interface and stored in the storage regions.

* * * * *